United States Patent
Yip

(10) Patent No.: US 8,553,810 B2
(45) Date of Patent: Oct. 8, 2013

(54) FREQUENCY OFFSET AND CHANNEL GAIN TRACKING FOR ENHANCED TRANSMISSION EFFICIENCY

(75) Inventor: Kun-Wah Yip, Hong Kong (CN)

(73) Assignee: Koninklijke Philips N.V., Eindhoven (NL)

( * ) Notice: Subject to any disclaimer, the term of this patent is extended or adjusted under 35 U.S.C. 154(b) by 73 days.

(21) Appl. No.: 13/265,197

(22) PCT Filed: Apr. 13, 2010

(86) PCT No.: PCT/IB2010/051582
§ 371 (c)(1),
(2), (4) Date: Oct. 19, 2011

(87) PCT Pub. No.: WO2010/122444
PCT Pub. Date: Oct. 28, 2010

(65) Prior Publication Data
US 2012/0051417 A1    Mar. 1, 2012

(30) Foreign Application Priority Data
Apr. 23, 2009   (EP) .................................... 09305345

(51) Int. Cl.
*H04L 27/26*   (2006.01)
(52) U.S. Cl.
USPC .......... 375/340; 375/232; 375/346; 375/260; 370/208; 370/322; 370/210; 370/480
(58) Field of Classification Search
USPC .................. 370/200–546; 375/130–377; 455/1–899; 600/1–595; 701/1–302
See application file for complete search history.

(56) References Cited

U.S. PATENT DOCUMENTS

| | | | | |
|---|---|---|---|---|
| 7,308,034 B2 * | 12/2007 | Jeon et al. | ...................... | 375/260 |
| 7,529,295 B1 * | 5/2009 | Nezami | ........................ | 375/226 |
| 7,653,164 B2 * | 1/2010 | Lin et al. | ....................... | 375/350 |
| 8,107,566 B2 * | 1/2012 | Wallace et al. | ............... | 375/346 |
| 8,311,152 B1 * | 11/2012 | Lee et al. | ....................... | 375/316 |
| 8,311,163 B2 * | 11/2012 | Chen et al. | ..................... | 375/340 |
| 2002/0075904 A1 * | 6/2002 | Dabak et al. | ................. | 370/510 |
| 2004/0001539 A1 * | 1/2004 | Sankaran et al. | ............. | 375/231 |
| 2004/0001563 A1 * | 1/2004 | Scarpa | .......................... | 375/326 |

(Continued)

FOREIGN PATENT DOCUMENTS

| | | |
|---|---|---|
| KR | 2006053511 A | 11/2004 |
| WO | WO2008052573 A1 | 5/2008 |
| WO | WO 2008052573 A1 * | 5/2008 |

OTHER PUBLICATIONS

Yong-Hwa Kim et al: "Joint Common Phase Error and Channel Estimation for OFDM-based WLANs in the Presence of Wiener Phase Noise and Residual Frequency Offset" Communications, 2006. ICC '06. IEEE International Conference on, IEEE, PI, Jun. 1, 2006, pp. 3048-3045.*

(Continued)

*Primary Examiner* — Daniel Washburn
*Assistant Examiner* — Amneet Singh
(74) *Attorney, Agent, or Firm* — Larry Liberchuk

(57) ABSTRACT

The present invention relates to an apparatus, method and computer program product for enhanced data reception, wherein a tracking procedure is enhanced to support long payloads by introducing additional channel-gain tracking applied together with frequency-offset tracking to the payload data. Thereby, both residual frequency offset and residual channel gain are reduced.

9 Claims, 6 Drawing Sheets

(56) References Cited

U.S. PATENT DOCUMENTS

| | | | | |
|---|---|---|---|---|
| 2004/0004935 | A1* | 1/2004 | Zhu et al. | 370/208 |
| 2004/0190637 | A1* | 9/2004 | Maltsev et al. | 375/260 |
| 2005/0122895 | A1 | 6/2005 | Zhou | |
| 2005/0125176 | A1* | 6/2005 | Makhlouf et al. | 702/69 |
| 2005/0226341 | A1* | 10/2005 | Sun et al. | 375/260 |
| 2006/0088112 | A1* | 4/2006 | Das et al. | 375/260 |
| 2007/0253497 | A1* | 11/2007 | Chen | 375/260 |
| 2007/0280394 | A1* | 12/2007 | Fung et al. | 375/362 |
| 2008/0013650 | A1* | 1/2008 | Engdahl | 375/344 |
| 2008/0045843 | A1* | 2/2008 | Tsuji | 600/481 |
| 2010/0312071 | A1* | 12/2010 | Schenk | 600/300 |

OTHER PUBLICATIONS

Yonghwa Kim et al., "Joint Common Phase Error and Channel Estimation for OFDM-Based WLANs in the Presence of Wiener Phase Noise and Residual Frequency Offset", Communications, 2006. ICC '06. IEEE International Conference on, IEEE, PI, Jun. 1, 2006, pp. 30403045, XP031025534.

Freda M M et al., "Joint Channel Estimation and Synchronization for OFDM Systems", 2004 IEEE 60th Vehicular Technology Conference. VTC2004-Fall (IEEE Cat. No. 04CH37575) IEEE Piscataway, NJ, USA,, vol. 3, Sep. 26, 2004, pp. 1673-1677, XP010786920.

Nikitopoulos K et al., "Inter-Frame, Fine Frequency/Phase Synchronization for Simple Space-Time-Coded OFDM Receivers", IEEE Transactions on Wireless Communications, IEEE Service Center, Piscataway, NJ, US LNKDDOI: 10.1109/TWC.2007.060027, vol. 6, No. 10, Oct. 1, 2007, pp. 3510-3514, XP011194394.

Funada R et al., "Performance Improvement of Decision-Directed Channel Estimation for DPC-0D/TDMA in a Fast Fading Environment", 2004 IEEE 60th Vehicular Technology Conference. VTC2004-Fall (IEEE Cat. No. 04CH37575) IEEE Piscataway, NJ, USA,, vol. 7, Sep. 26, 2004, pp. 5125-5129, XP010790382.

Jeil Jo et al: "Residual Frequency Offset Compensation for IEEE 802.11A", 2004 IEEE 60th Vehicular Technology Conference. VTC2004-Fall (IEEE Cat. No. 04CH37575) IEEE Piscataway, NJ, USA,, vol. 3, Sep. 26, 2004, pp. 2201-2204, XP01078703.

Yoo, Jerals et al., "Analysis of Body Sensor Network Using Human Body as the Channel", Korea Advanced Institute of Science and Technology (KAIST), 1233 Electrical Engineering, KAIST 373-1, Guseong, Yuseong, Daejeon, South Korea, Mar. 2008.

Luise, Marco et al., "Carrier Frequency Recovery in All-Digital Modems for Burst-Mode Transmissions", IEEE Transactions on Communications, vol. 43, pp. 1169-1178, Feb./Mar./Apr. 1995, pp. 1169-1178.

* cited by examiner

FREQUENCY OFFSET AND CHANNEL GAIN TRACKING FOR ENHANCED TRANSMISSION EFFICIENCY

FIELD OF THE INVENTION

The present invention relates to an apparatus, method, and computer program product for processing packet data, such as—but not limited to—body-coupled communication signals.

BACKGROUND OF THE INVENTION

Body-coupled communications (BCC) or body-based communication has been proposed as a promising alternative to radio frequency (RF) communication as a basis for body area networks (BANs). BCC allows exchange of information between a plurality of devices which are at or in close proximity of a body of a human or an animal. This can be achieved by capacitive or galvanic coupling of low-energy electric fields onto the body surface. Signals are conveyed over the body instead of through the air. As such, the communication is confined to an area close to the body in contrast to RF communications, where a much larger area is covered. Therefore, communication is possible between devices situated on, connected to, or placed close to the body. Moreover, since lower frequencies can be applied then typically applied in RF-based low range communications, it opens the door to low-cost and low-power implementations of BANs or personal area networks (PANs). Hence, the human body is exploited as a communication channel, so that communication can take place with much lower power consumption than in standard radio systems commonly used for BANs (e.g. ZigBee or Bluetooth systems). Since BCC is usually applied in close proximity to the body, it can be used to realize new and intuitive body-device interfaces based on contact or proximity. This creates possibilities for many applications in the field of identification and security.

BCC can be technically realized by electric fields that are generated by a small body-worn tag, e.g., being integrated to a credit card or another suitable device attached to or warn in close proximity to the body. This tag capacitively or galvanically couples a low-power signal to the body. Sometimes this body-coupled communication is referred to as "near-field intra-body communication". BCC is a wireless technology that allows electronic devices on and near the human body to exchange digital information through capacitive or galvanic coupling via the human body itself. Information is transmitted by modulating electric fields and either capacitively or galvanically coupling tiny currents onto the body. The body conducts the tiny signal to body mounted the receivers. The environment (the air and/or earth ground) provides a return path for the transmitted signal.

FIG. 1 shows an exemplary body communication system structure, where data signals are transmitted via couplers placed near or on the body. These couplers transfer the data signal, either galvanically or capacitively, to the body. In the example of FIG. 1, one coupler or electrode provides ground potential GND and the other coupler or electrode is used for transmitting/receiving a signal S. More specifically, transmission from a transmitter (TX) 10 to a receiver (RX) 20 over a human arm is depicted. Generally, every node can in principle act both as transmitter and receiver, i.e., as a transceiver (TRX), and communication can take place from everywhere on the body.

BAN technology is standardized by the 802.15.6 Task Group of IEEE. This standardization task group has an ambition to include on-body and in-body communications in the standard. The details described below in connection with the embodiments can be applied to on-body communications and in-body communications as well. In the following discussion, it will be referred to the case of in-body communications between medical implants and external programmers. Of course, the invention can as well be applied to any kind of data communication.

A communication band from 402 to 405 MHz with a channel spacing of 300 kHz has been set aside for wireless communications involving medical implants. This band is called the Medical Implant Communication Service (MICS) band. It is envisaged that the IEEE 802.15.6 Task Group will adopt packet-based communications in the standard.

MICS-band communications can be applied to various applications, such as electronic pills (e-Pill), implantable drug delivery, deep brain simulation, capsule endoscope, etc. Such applications cover a wide range of data rates, e.g., from about 100 bps (integrated drug delivery) to about 1.5 Mbps (capsule endoscope). A capsule endoscope is a medical implant that is swallowed by a patient and takes images of the gastrointestinal system when it reaches the desired location inside the body. Such endoscope can be used to help doctors in medical diagnosis. The images taken by the endoscope are transmitted from inside the body to the outside through a wireless radio link. To support endoscope applications, 64 QAM (Quadrature Amplitude Modulation) at 250 k symbols per second may for example be used with a square-root raised cosine (SRRC) pulse shape of rolloff factor 0.15 in MICS-band communications. The signal is thereby contained within the 300 kHz band. The use of such high transmission rate and high modulation format requires accurate frequency synchronization, timing synchronization and channel estimation.

To achieve the desired accuracy, a data packet is required to be properly designed. The data packet consists of a preamble and a data payload. The preamble is a known sequence enabling a receiver to achieve frequency synchronization, etc. As an example, it may be estimated that a preamble length of 336 symbols is required. A lower number of symbols may result in unsatisfactory accuracy, so that it is not likely to reduce the preamble length. It is however noted that the preamble is a transmission overhead, so that a longer preamble reduces transmission efficiency, which is not desirable.

The payload or payload portion which follows the preamble in the data packet carries the data. It may have a payload length of 1024 symbols. Simulations have been performed on a receiver to decode packets with a payload length of 1024 symbols and a preamble length of 336 symbols. Received packets are routed through several receiver functions, such as coarse frequency offset estimation, timing synchronization, fine frequency offset estimation, channel estimation, channel equalization, frequency offset tracking, and finally symbol demodulation. At a signal-to-noise ratio (SNR) of 24 dB, the uncoded block error rate (BER), i.e., the BER without error correction coding, was found to be 0.0016, which is consistent with text book figures.

FIG. 3 shows a typical constellation diagram of the decoded symbols observed in some simulation runs. It depicts detected variations within the 64 possible states of the 64 QAM signal. This diagram serves as a reference constellation diagram that yields satisfactory decoding results, due to the fact that the 64 different constellations can be clearly discriminated or distinguished at the receiver.

Although the BER performance is satisfactory, the transmission efficiency of the data packets is only 1024/(336+1024) which corresponds to about 75%. The net data transmission rate is only 250 k symbols per second multiplied by 6 bits per symbol multiplied by 75%, which equals to 1.125 Mbps, quite far from the best data rate of 1.5 Mbps. It is thus desirable to increase transmission efficiency. This could be achieved for example, by increasing the payload length to 4096 symbols, which results in an efficiency of 4096/(336+ 4096) and corresponds to about 92%, which gives a net data transmission rate of 1.38 Mbps. However, an important problem is receiver performance, as explained in the following.

FIGS. 4a to 4c show samples of decoded-symbol constellation diagrams obtained in simulation runs with a payload length of 4096 symbols and a conventional receiver processing. The constellation diagram shown in FIG. 4a is symmetric and yields a satisfactory BER. On the other hand, the ones shown in FIGS. 4b and 4c are rotated and distorted, and thus lead to high BERs, since the constellations cannot be clearly discriminated or distinguished at the receiver. It has been found from a simulation of 1000 packets that the average BER is 0.0406, significantly greater than the BER for the case of a payload length of 1024 symbols.

SUMMARY OF THE INVENTION

An object of the present invention is to provide an improved receiver processing which significantly lessens the problem of rotation and distortion, so that a satisfactory error rate and transmission efficiency can be achieved even in cases of high payload lengths.

This object is achieved by an apparatus as claimed in claim 1, a method as claimed in claim 10, and a computer program product as claimed in claim 11.

Accordingly, a tracking processing is provided to support long payloads. When a preamble arrives, frequency offset estimation and channel estimation are performed. Owing to the limited preamble length, estimation errors exist for the two estimates, resulting in the presence of residual frequency offset and residual channel gain. However, due to the segmentation, frequency tracking and additional channel-gain tracking, a residual frequency offset and additional phase shift introduced by the frequency offset compensation can be reduced. The combined channel-gain tracking and frequency-offset tracking thus results in a reduction of both residual frequency offset and residual channel gain, so that the runaway problem caused by long payload lengths can be removed and a good error rate can be maintained.

According to a first aspect, each of the segments may include a predetermined number of symbols, wherein the partitioner may be adapted to discard remaining symbols of the payload portion not enough to form a segment. This measure provides the advantage that any segment length can be selected regardless of the total length of the payload portion.

According to a second aspect which may be combined with the first aspect, the tracking processor may be adapted to frequency-offset compensate and channel-equalize symbols of a segment based on estimates of a residual frequency offset and a residual channel gain obtained in previous segments, to obtain resultant channel-equalized symbols. This successive use of results obtained from previous segments can ensure that residual frequency offset and residual channel gain are successively reduced.

According to a third aspect which can be combined with any one of the first and second aspects, the tracking processor may be adapted to demodulate resultant channel-equalized symbols and to use the demodulated symbols for removing modulation of the resultant channel-equalized symbols. Thereby, residual modulation can be removed from the resultant channel-equalized symbols.

According to a fourth aspect which can be combined with any one of the first to third aspects, the tracking processor may be adapted to use a predetermined number of modulation-removed symbols of a segment for the frequency-offset tracking and the channel-gain tracking. This provides the advantage that time is left for calculations or other processing during the payload portion.

As an example, the predetermined number of the modulation-removed symbols may be located at the beginning of the segment.

According to a fifth aspect which may be combined with any one to the first to fourth aspects, the tracking processor may comprise a zero-forcing equalizer.

According to a sixth aspect which can be combined with any one of the first to fourth aspects, the tracking processor may comprise a minimum mean-square error equalizer, wherein the estimator may be adapted to estimate a signal-to-noise ratio based on the preamble portion, the signal-to-noise ratio being supplied to the minimum mean-square error equalizer. This equalizer can reduce a noise-enhancement effect provided by other types of equalizers. In this case, the tracking processor may be adapted to perform signal-to-noise ratio estimation based on a predetermined number of symbols of each segment, and to store the estimation result, so as to be used for symbols received after a current segment.

It is noted that the apparatus may be provided in a receiver or transceiver for any kind of data packets and may be implemented as a discrete hardware circuitry with discrete hardware components, as an integrated chip, as an arrangement of chip modules, or as a signal processing device or chip controlled by a software routine or program stored in a memory, written on a computer readable medium, or downloaded from a network, such as the Internet.

Further advantageous embodiments are defined below.

BRIEF DESCRIPTION OF THE DRAWINGS

The invention will now be described, by way of example, based on embodiments with reference to the accompanying drawings, wherein.

DESCRIPTION OF PREFERRED EMBODIMENTS

Various embodiments of the present invention will now be described based on a receiver processing for communications in BANs or between a medical implant and a device outside a human body. Of course, the present invention can also be applied to other types of communications not related to the above specific applications.

In the present embodiments, communications are expected to be packet-based. A packet consists of a preamble and a payload field. The preamble is an overhead. In high-rate transmissions, increasing the payload length is important in order to maximize transmission efficiency. Furthermore, inclusion of high-speed data transmission into the IEEE 802.15.6 standard is desirable. As an example, such communication may be used for intelligent textile, which enables clothes and dresses to display motion pictures and vivid videos on surfaces. With a high-speed BAN, the video pattern which is bandwidth-consuming can be transmitted from a central hub on the body to display elements without the need to embed cumbersome, high-grade cables or wires inside the clothes. Other examples may be in the area of medical implants. A medical implant is required to wirelessly communicate with the device, known as the programmer, outside the human body. Some medical-implant applications, such as endoscopy, require high-speed links between programmers and implants. Again, it is stressed that the proposed receiver processing is however useful and applicable to communications in all application areas and in no way restricted to the medical area.

Figure 4A:
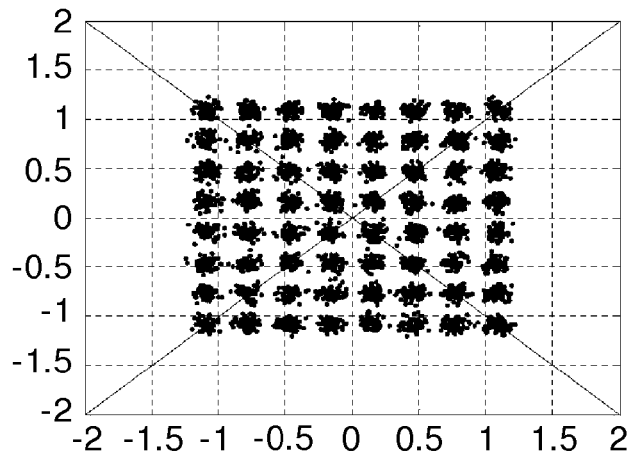
FIGS. 4a to 4c show constellation diagrams of decoded symbols for a long payload length obtained by a conventional receiver processing.
Figure 4B:
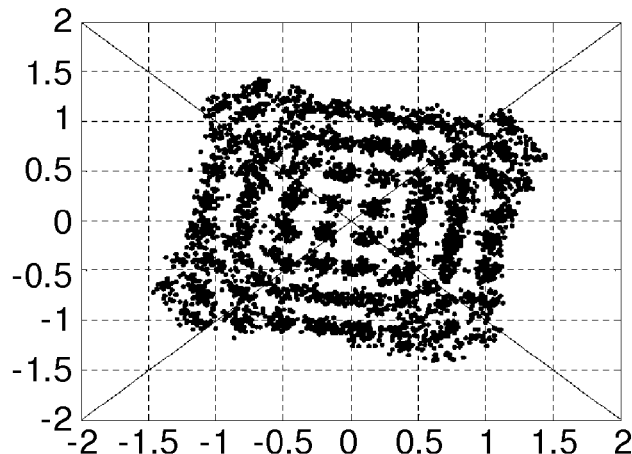
Figure 4C:
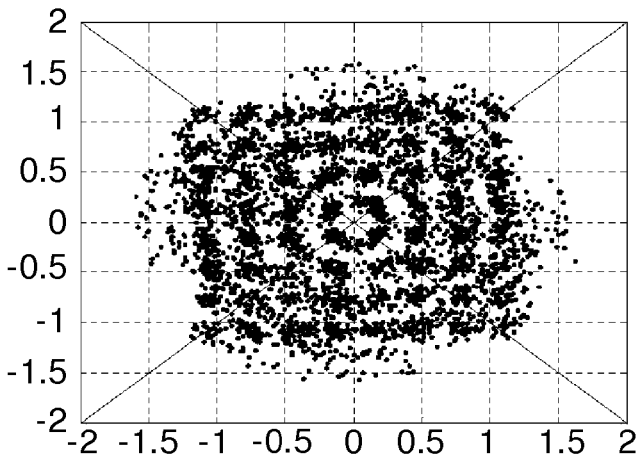

The non-desirable rotation and distortion of the constellation diagram in FIGS. 4b and 4c are not only the result of a residual frequency offset, but also (post-equalization) residual channel gain. When a preamble arrives, frequency offset estimation and channel estimation are performed. However, owing to the limited preamble length, estimation errors exist for the two estimates, resulting in the presence of a residual frequency offset and a residual channel gain. Each execution of frequency offset compensation, with the purpose of reducing the residual frequency offset, now introduces an additional phase shift to the signal. This additional phase shift is effectively absorbed into the residual channel gain, making this error greater and greater. If the payload portion of the packet is long, this error may run away, resulting in a tremendous number of decoding errors and thus leading to very high error rates.

According to the following embodiments, an additional channel-gain tracking is introduced, so that frequency-offset tracking and channel-gain tracking can be applied together to the payload portion. Thereby, both residual frequency offset and residual channel gain can be reduced and the runaway problem can be alleviated, so that a good error rate is maintained.

In some embodiments, a tracking processing is provided, where tracking begins when a receiver receives the payload of a data packet. This payload is partitioned or divided into segments each of which has a length of $N_{TR\_seg}$ symbols.

Figure 1:
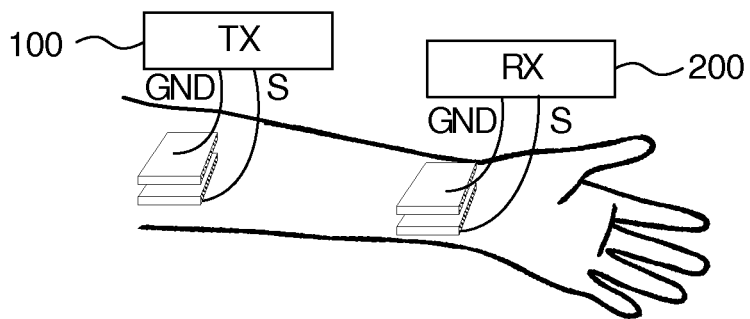
FIG. 1 shows a schematic electrode arrangement of a BCC system.
Figure 2:
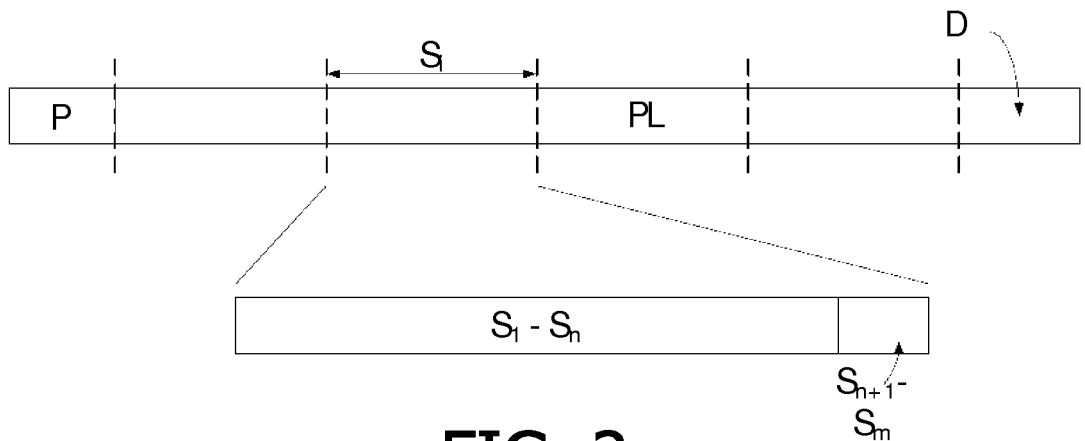
FIG. 2 shows a schematic representation of a data packet with a partition of a payload portion into segments.
Figure 3:
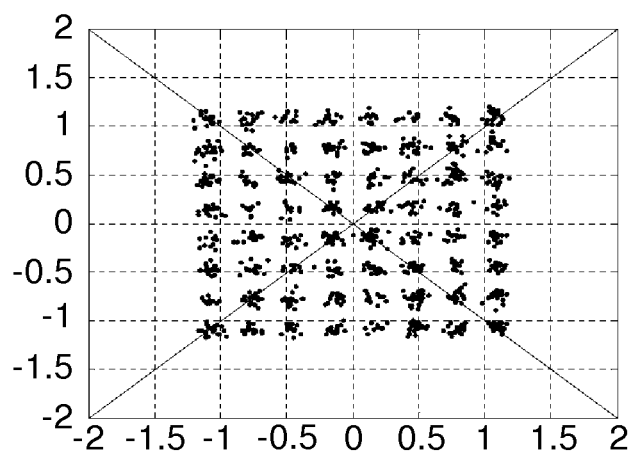
FIG. 3 shows a constellation diagram of decoded symbols for the case of a short payload length.

FIG. 2 shows a schematic diagram indicating a data packet with a preamble P and a payload PL which is partitioned into segments $S_i$ which comprise symbols $s_1$ to $s_m$. The symbols of each segment can be further divided into a predetermined number of first symbols $s_1$ to $s_n$ and a predetermined number of remaining symbols $s_{n+1}$ to $s_m$. Symbols remaining at the end of the payload PL after segmentation and not enough to form a segment can be discarded in the process of tracking, but frequency-offset compensation and channel equalization (based on a knowledge of residual channel gain) can still be carried out. FIG. 2 shows a discarded portion D indicating discarded symbols.

The proposed additional channel-gain tracking which is applied together with frequency-offset tracking significantly lessens the problem of rotation and distortion. A satisfactory BER can be achieved even if the payload length is increased to for example 4096 symbols. As a result, a transmission efficiency of over 90% can be achieved.

Figure 5A:
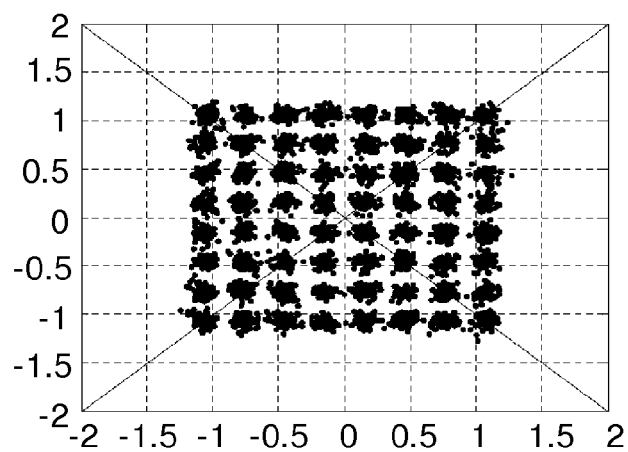
FIGS. 5a to 5c show constellation diagrams of decoded symbols for the case of a long payload length and a tracking processing according to an embodiment of the invention.
Figure 5B:
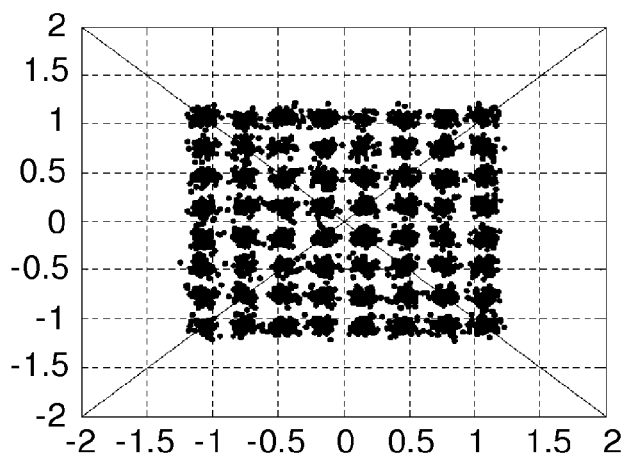
Figure 5C:
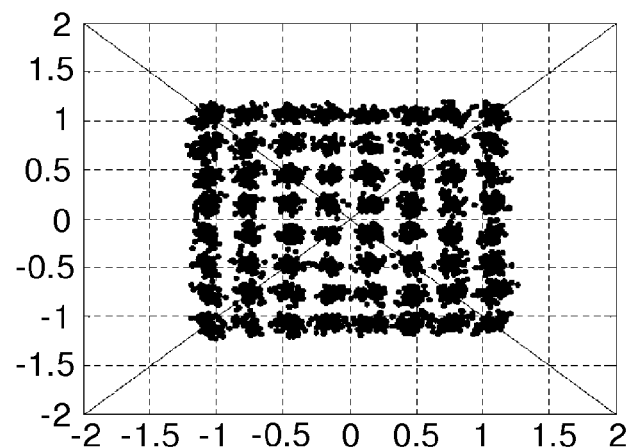

FIGS. 5a to 5c show constellation diagrams of decoded symbols when the payload length is 4096 symbols and the proposed tracking processing is applied. It is apparent that the constellation diagrams are symmetric and not distorted. Thus, information transmitted using the 64 QAM scheme can be clearly discriminated and demodulated at the receiver side. Simulation results show that the BER is 0.0009, consistent with the BER obtained for the case of a payload length of 1024. However, the proposed tracking scheme is also effective if a payload length of more than 4096 symbols is used. Even at payload lengths of up to 65536 symbols, a sufficient BER can be obtained.

Figure 6:
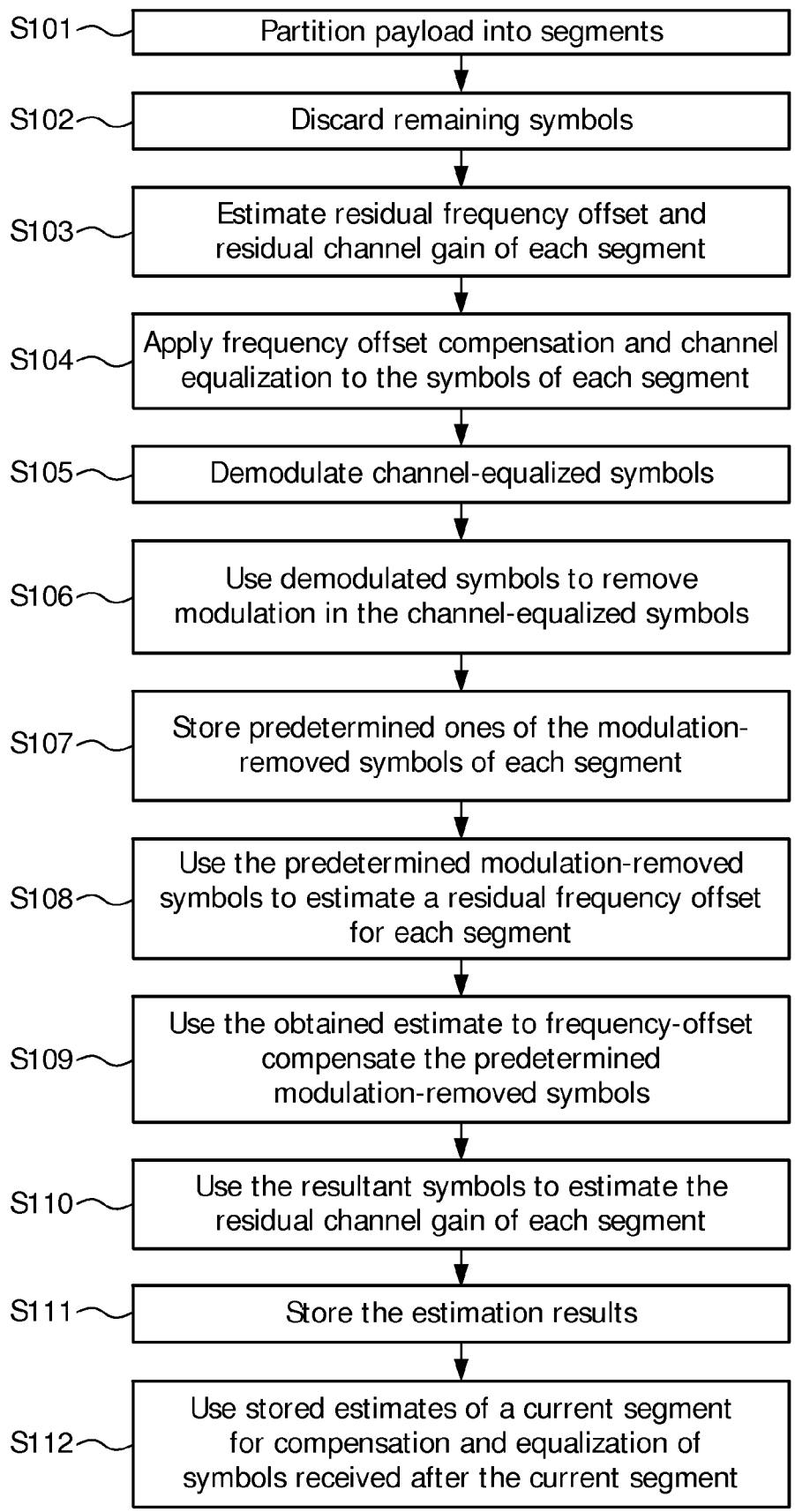
FIG. 6 shows a schematic flow diagram of a tracking processing according to a first embodiment of the invention.

FIG. 6 shows a flow diagram of a tracking processing according to a first embodiment.

When the receiver receives a packet with a payload portion, the payload portion is partitioned into segments (step S101), wherein each segment has a predetermined length. Remaining symbols at the end of the payload portion not enough to form a segment are discarded in step S102. Then, in step S103 a residual frequency offset and a residual channel gain of each segment are estimated. It is noted that step S103 can be executed when a segment is received. It does not need to be delayed by first completing S102.

In step S104, frequency offset compensation and channel equalization is applied to the symbols of each segment. This is achieved by using estimates of residual frequency offset and residual channel gain obtained in previous segments. The resultant channel-equalized symbols are demodulated in step S105 to obtain $N_{TR\_seg}$ demodulated symbols. These demodulated symbols are used in step S106 to remove modulation in the $N_{TR\_seg}$ channel-equalized symbols. Then, in step S107, predetermined ones of the modulation-removed symbols of each segment are stored. These may be the first $N_{sym4TR}$ modulation-removed symbols, wherein $N_{sym4TR} \leq N_{TR\_seg}$. In step S108, the predetermined modulation-removed symbols are used to estimate a residual frequency offset for each segment. This estimate is then used in step S109 to frequency-offset compensate the $N_{sym4TR}$ modulation-removed symbols. The resultant symbols are subsequently used in step S110 to estimate the residual channel gain of each segment. The estimation result is then stored in step S111. Finally, in step S112, the stored estimates of a current segment are used for compensation and equalization of symbols received after the current segment.

It is noted that the above processing can be performed in parallel for each segment or serially segment-by-segment.

Figure 7:
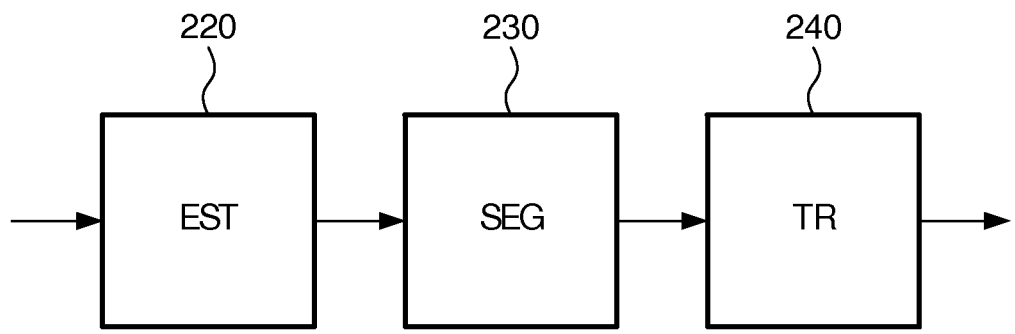
FIG. 7 shows a schematic block diagram of a receiver according to the first embodiment.

FIG. 7 shows a schematic block diagram of receiver processing blocks used for the proposed tracking procedure. In an estimation block or estimation unit or estimator 220 frequency offset estimation and channel estimation are performed based on a preamble portion of a received data packet. Then, the data packet is supplied to a segmentation block or segmentation unit or segmentor 230 where its payload portion is divided or partitioned into segments of constant or various lengths. The segments are then serially or in parallel supplied to a tracking processor 240 where the proposed tracking processing with channel-gain tracking and frequency offset-tracking are applied together to the symbols of each segment.

In the following, the above tracking steps of FIG. 6 are explained in more detail based on equations on which the respective individual processing is based. Throughout the following discussion, variables n, q and m are related to each other by the following equation:

$$n = qN_{TR\_seg} + m \quad (1)$$

where q and m are the quotient and the remainder, respectively, when n is divided by $N_{TR\_seq}$.

Assuming that $r_n$ is the n-th complex-valued received symbol of the payload, where n=0, 1, ... and the communication channel (e.g. MICS-band communication channel) is considered a single-path channel with additive wide Gaussian noise (AWGN), a received symbol is given by:

$$r_n = g_{ch} s_n e^{j2\pi(\delta f_{off})nT_s} + \eta_n \quad (2)$$

where 1/T, is the symbol transmission rate, $s_n$ is the n-th transmitted data symbol in the payload, $\delta f_{off}$ is the frequency offset, $g_{ch}$ is the complex-valued channel gain, and $\eta_n$ is the complex noise and interference. It is further assumed that prior to the reception of the payload, the receiver has knowledge of the estimated frequency offset $\delta\hat{f}_{off}$ and the estimated channel gain $\hat{g}_{ch}$ based on observation of the received preamble (e.g. in the estimator 220 of FIG. 7).

It is noted that the received symbols are assumed to be obtained after the received signal is processed by matched filtering, so that the received symbol rate is equal to the rate of the transmitted data symbols. That is, there is no oversampling in the received symbol sequence when compared to the transmitted data sequence.

Consider the q-th segment, where $q \in \{0, 1, 2, \ldots\}$. Let $$\delta f_{off}^{(q)} = \delta f_{off}^{(0)} - \delta\hat{f}_{off}^{(0)} - \delta\hat{f}_{off}^{(1)} - \ldots - \delta\hat{f}_{off}^{(q-1)}, \quad q \geq 1, \quad (3)$$

and $$\delta f_{off}^{(0)} = \delta f_{off} - \delta\hat{f}_{off}, \quad (4)$$

where $\delta\hat{f}_{off}^{(i)}$ denotes the estimate of $\delta f_{off}^{(i)}$. Let $$\delta g_{ch}^{(q)} = \frac{g_{ch}}{\hat{g}_{ch}} \cdot \frac{1}{\delta\hat{g}_{ch}^{(0)} \cdot \delta\hat{g}_{ch}^{(1)} \ldots \delta\hat{g}_{ch}^{(q-1)}}, \quad q \geq 1, \quad (5)$$

and $$\delta g_{ch}^{(0)} = \frac{g_{ch}}{\hat{g}_{ch}}, \quad (6)$$

where $\delta\hat{g}_{ch}^{(i)}$ denotes the estimate of $\delta g_{ch}^{(i)}$. By following the tracking processing described below, it can be shown that $\delta f_{off}^{(q)}$ and $\delta g_{ch}^{(q)}$ are the residual frequency offset and the residual channel gain, respectively, of the received symbols after compensation and equalization in the beginning of the q-th segment.

In step S104 of FIG. 6 compensation and equalization is performed. The compensated-and-equalized output of $r_n$, denoted as $\Theta_n$, is given by $$\Theta_n = r_n \mu_n \Omega_n \chi_n \quad (7)$$

where $$\begin{cases} \mu_n = \mu_{n-1} \exp\left[-j2\pi\left(\delta\hat{f}_{off} + \sum_{i=0}^{q-1} \delta f_{off}^{(i)}\right)T_s\right] \\ \mu_0 = 1 \end{cases} \quad (8)$$

describes the frequency-offset compensation, $$\Omega_n = \begin{cases} \frac{1}{\hat{g}_{ch}} \cdot \frac{1}{\delta\hat{g}_{ch}^{(0)} \cdot \delta\hat{g}_{ch}^{(1)} \ldots \delta\hat{g}_{ch}^{(q-1)}} & q \geq 1 \\ \frac{1}{\hat{g}_{ch}} & q = 0 \end{cases} \quad (9)$$

corresponds to the factor for channel equalization, and $$\chi_n = \begin{cases} \exp\left[-j2\pi\left(\delta\hat{f}_{off}^{(q-1)} + \sum_{i=0}^{q-1} \delta f_{off}^{(i)}\right)T_s\right] \\ \mu_0 = 1 \end{cases} \quad (10)$$

corresponds to the compensation, due to the recent availability of $\delta\hat{f}_{off}^{(q-1)}$, for the phase shift introduced by the residual frequency offset in the (q−1)-th segment.

The demodulation in step S105 of FIG. 6 can be performed by any known demodulation rule to estimate the transmitted symbols. For the received symbol $r_n$, the estimated transmitted symbol is denoted by $\hat{s}_n$. Step S106 of FIG. 6 can be performed by computing the modulation-removed symbols according to the following equation:

$$\Psi_i^{(q)} = \Theta_n / \hat{s}_n. \quad (11)$$

In step S107 of FIG. 6 the first $N_{Sym4TR}$ values of the modulation-removed symbols obtained for the q-th segment (i=0, 1, ..., $N_{Sym4TR}$−1) are stored. These values are used for subsequent steps.

In step S108 of FIG. 6 the residual frequency offset $\delta f_{off}^{(q)}$ is estimated based on the obtained $N_{sym4TR}$ values of the modulation-removed symbols. The resultant estimate corresponds to $\delta\hat{f}_{off}^{(q)}$. A known frequency-offset estimation algorithm which can be used is the Luise-Reggiannini method as described for example in M. Luise and R. Reggiannini, "Carrier frequency recovery in all-digital modems for burst-mode transmissions", *IEEE Transactions on Communications*, vol. 43, pp. 1169-1178, Febuary/March/April 1995. Of course, other frequency-offset estimation algorithms can be used as well.

In step S109 of FIG. 6 compensation for $\delta\hat{f}_{off}^{(q)}$ is performed in the block of symbols $\Psi_i^{(q)}$ obtained in step S107. The i-th compensated symbol, $Y_i^{(q)}$, is given by $$Y_i^{(q)} = \Psi_i^{(q)} \cdot \exp[-j2\pi(\delta\hat{f}_{off}^{(q)})iT_s]. \quad (12)$$

In step S110 of FIG. 6 the channel gain $\delta g_{ch}^{(q)}$ is estimated. This estimate $\delta\hat{g}_{ch}^{(q)}$ is given by $$\delta\hat{g}_{ch}^{(q)} = \frac{1}{N_{Sym4TR}} \sum_{i=0}^{N_{sym4TR}-1} Y_i^{(q)}. \quad (13)$$

In step S111 of FIG. 6 the obtained values of $\delta\hat{f}_{off}^{(q)}$ and $\delta\hat{g}_{off}^{(q)}$ are stored in a memory for use in frequency-offset compensation and channel equalization for symbols received in the (q+1)-th segment and thereafter.

The channel equalizer used in the tracking processor 240 of the above first embodiment can be a zero-forcing equalizer. In such a zero-forcing equalizer, the input signal is multiplied by the reciprocal of the channel response or channel transfer function of a particular channel through which the input signal is received. This is intended to remove the effect of the channel from the received signal, such as inter-symbol interference (ISI). However, when the channel is noisy, the zero-forcing equalizer may amplify the noise greatly at frequencies where the channel response has a small magnitude in the attempt to invert the channel completely. Thus, the zero-forcing equalizer may enhance the noise.

Figure 8:
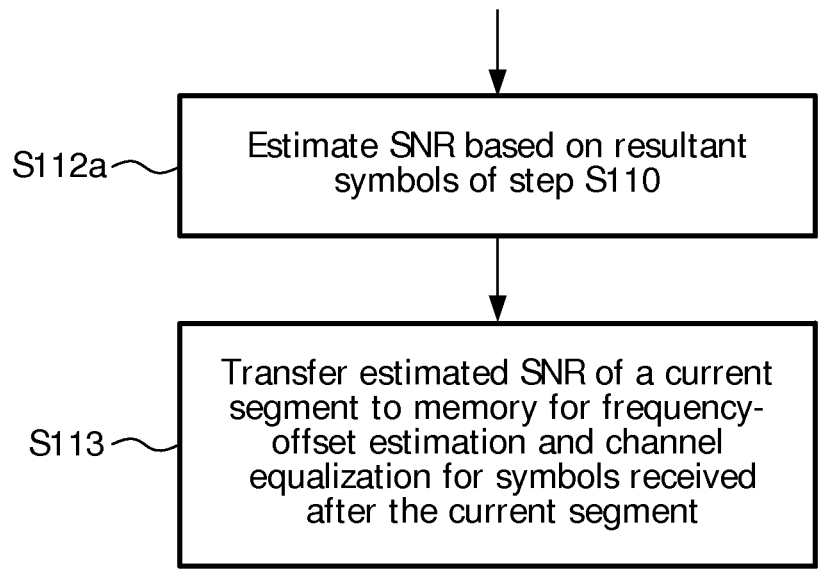
FIG. 8 shows a flow diagram portion as amended in a second embodiment.

A more balanced linear equalizer, such as the minimum mean-square error equalizer (MMSE equalizer) is used in the following second embodiment, which does not usually eliminate ISI completely but instead minimizes the total power of the noise and ISI components in the output signal. Thus, such a linear equalizer can reduce the noise-enhancement effect. More specifically, the second embodiment can be obtained by modifying some steps of the first embodiment of FIG. 6 and adding two more steps S112a and S113 as shown in FIG. 8.

For the MMSE equalizer, knowledge of the signal-to-noise ratio (SNR) is required. It is therefore assumed that, in addition to $\delta \hat{f}_{off}^{(q)}$ and $\hat{g}_{ch}$, an additional knowledge of the estimated SNR based on the observation of the received preamble is available before the reception of the payload. It is noted that $\widehat{SNR}_{.preamble}$ denotes the SNR estimated from the received preamble (e.g. in the estimator 220 of FIG. 7).

The expressions of $\delta f_{off}^{(q)}$ and $\delta f_{off}^{(0)}$ follow equations (3) and (4), respectively. The expressions of $\delta g_{ch}^{(q)}$ and $\delta g_{ch}^{(0)}$ are modified to (14):

$$\delta g_{ch}^{(q)} = \frac{g_{ch}}{\hat{g}_{ch}} \cdot \frac{1}{\delta \hat{g}_{ch}^{(0)} \cdot \delta \hat{g}_{ch}^{(1)} \cdots \delta \hat{g}_{ch}^{(q-1)}} \cdot \frac{\widehat{SNR}_{.preamble}}{1 + \widehat{SNR}_{.preamble}} \cdot$$
$$\frac{\widehat{SNR}_{.0}}{1 + \widehat{SNR}_{.0}} \cdot \frac{\widehat{SNR}_{.1}}{1 + \widehat{SNR}_{.1}} \cdots \frac{\widehat{SNR}_{.q-1}}{1 + \widehat{SNR}_{.q-1}} \cdot \quad (15)$$

With $q \geq 1$ and $$\delta g_{ch}^{(0)} = \frac{g_{ch}}{\hat{g}_{ch}} \cdot \frac{\widehat{SNR}_{.preamble}}{1 + \widehat{SNR}_{.preamble}} \cdot$$

where $\widehat{SNR}_{.m}$, to be elaborated later, is the SNR estimated from the symbols in the m-th segment.

In step S104 of FIG. 6 frequency-offset compensation and channel equalization are performed. Equations (7), (8) and (10) can be used, while (9) is modified to equation (16):

$$\Omega_n = \left\{ \frac{1}{\hat{g}_{ch}} \cdot \frac{1}{\delta \hat{g}_{ch}^{(0)} \cdot \delta \hat{g}_{ch}^{(1)} \cdots \delta \hat{g}_{ch}^{(q-1)}} \cdot \frac{\widehat{SNR}_{.preamble}}{1 + \widehat{SNR}_{.preamble}} \cdot \frac{\widehat{SNR}_{.0}}{1 + \widehat{SNR}_{.0}} \cdot \frac{\widehat{SNR}_{.1}}{1 + \widehat{SNR}_{.1}} \cdots \frac{\widehat{SNR}_{.q-1}}{1 + \widehat{SNR}_{.q-1}} \cdot \right.$$
$$\left. \frac{1}{\hat{g}_{ch}} \cdot \frac{\widehat{SNR}_{.preamble}}{1 + \widehat{SNR}_{.preamble}} \right\}$$

The first equation being for $q \geq 1$ and the second one for $q=0$

Steps S105 to S111 are the same as the ones in the first embodiment, and are not repeated here.

In the additional step S112a of FIG. 8, SNR estimation is performed based on $Y_i^{(q)}$, i=0, 1, . . . , $N_{sym4TR}-1$. There are more than one method to estimate the SNR. One method is:

$$\widehat{SNR}_{.q} = \left\{ \frac{1}{N_{sym4TR}} \sum_{i=0}^{N_{sym4TR}-1} \left| \frac{Y_i^{(q)}}{\delta \hat{g}_{ch}^{(q)}} - 1 \right|^2 \right\}^{-1} \quad (17)$$

Additionally, in step S113 of FIG. 8, $\widehat{SNR}_q$ is transferred to the memory for frequency-offset estimation and channel equalization for symbols received after the current segment.

Figure 9:
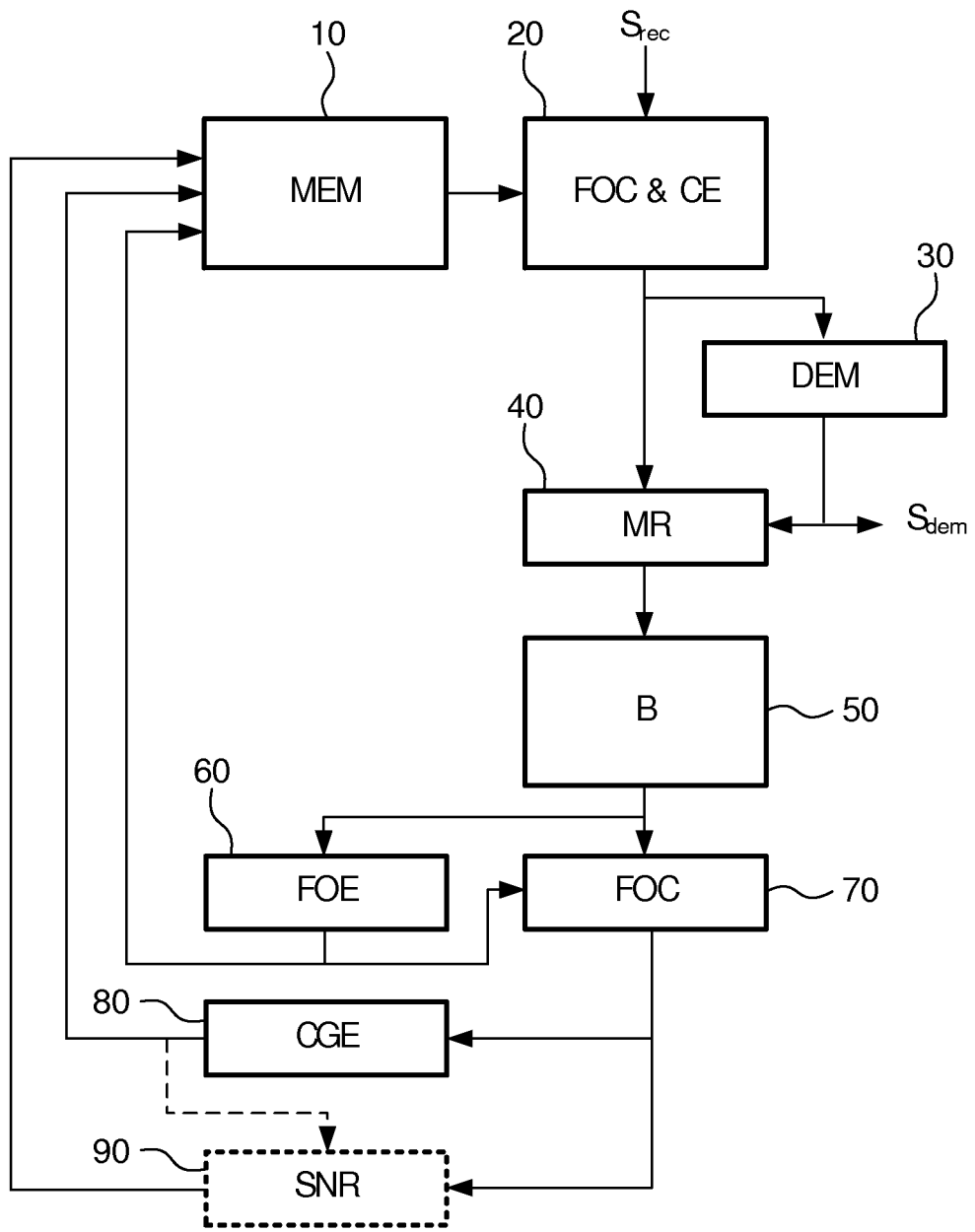
FIG. 9 shows a schematic block diagram of a tracking processor according to a third embodiment.

FIG. 9 shows a schematic block diagram of a tracking processor (e.g. tracking processor 240 in FIG. 7). The blocks in FIG. 9 may correspond to discrete hardware circuits or to processing blocks of a processing routine running in the tracking processor.

Received symbols $s_{rec}$ are supplied to a frequency offset compensation (FOC) and channel equalization (CE) circuit or function 20, and the output of this circuit is supplied to a demodulation circuit or function (DEM) 30 and in parallel to a modulation removal circuit or function (MR) 40, wherein the demodulated symbols $s_{dem}$ are used as an input to the modulation removal circuit or function 40. The modulation-removed symbols are supplied to a buffer stage (B) 50 for storing the modulation-removed symbols of a segment. The modulation-removed symbols stored in the buffer 50 are supplied in parallel to a frequency offset estimation circuit or function (FOE) 60 and to a frequency offset compensation circuit or function (FOC) 70. An output of the frequency offset estimation circuit or function 60 is supplied to a memory (MEM) 10 to store estimates of frequency offset, channel gain and (optionally) SNR, and to the frequency offset compensation circuit or function 70.

Additionally, an output of the frequency offset compensation circuit or function 70 is supplied to a channel gain estimation circuit or function (CGE) 80 and to an optional SNR estimation circuit or function 90 to which also an output of the channel-gain estimation circuit or function 80 is supplied. Output values of the channel-gain estimation circuit or function 80 and of the optional SNR estimation circuit or function 90 are also stored in the memory 10. The values or parameters stored in the memory 10 are used as an input to the frequency offset compensation and channel equalization circuit or function 20.

The tracking processor shown in FIG. 9 can be used to operate in line with the procedures shown in FIGS. 6 and 8.

It is noted that the above tracking processing and processor can be applied in any data receiver where data packets with preamble portions and payload portions are processed. Specific implementations are communication in BANs and between medical implants and external equipment.

In summary, the present invention relates to an apparatus, method and computer program product for enhanced data reception, wherein a tracking procedure is enhanced to support long payloads by introducing additional channel-gain tracking applied together with frequency-offset tracking to the payload data. Thereby, both residual frequency offset and residual channel gain are reduced.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill at least the functions of the tracking procedure, e.g. as described in connection with FIGS. 6 to 9, based on corresponding software routines. The computer program may be stored/distributed on a suitable medium such as an optical storage medium or a solid-state medium supplied together with or as a part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:

1. An apparatus comprising:
an estimator for performing frequency-offset and channel estimation based on a preamble portion of a received data packet;
a partitioner for partitioning a payload portion of said received data packet into segments; and
a tracking processor for applying frequency-offset tracking and channel-gain tracking based on said segments of said payload portion, the tracking processor being configured to:
apply an initial frequency offset compensation and channel equalization to symbols in a current segment by using estimates of a residual frequency offset and a residual channel gain established on the basis of symbols in a previous segment, so as to obtain channel-equalized symbols;
demodulate the channel equalized symbols, so as to obtain demodulated symbols;
remove modulation in the channel-equalized symbols by using the demodulated symbols, so as to obtain modulation-removed symbols;
estimate a residual frequency offset for the current segment based on a predetermined number of the modulation-removed symbols;
frequency-offset compensate the modulation-removed symbols on the basis of the residual frequency offset that has been estimated for the current segment, so as to obtain frequency-offset-compensated modulation-removed symbols;
estimate a residual channel gain for the current segment on the basis of the frequency-offset-compensated modulation-removed symbols; and
store the residual frequency offset and the residual channel gain, which have been estimated for the current segment, to apply an initial frequency offset compensation and channel equalization to symbols in a subsequent segment by using the residual frequency offset and the residual channel gain, which have been estimated for the current segment.

2. The apparatus according to claim 1, wherein each of said segments includes a predetermined number of symbols, and wherein said partitioner is adapted to discard remaining symbols of said payload portion, not enough to form a segment.

3. The apparatus according to claim 1, wherein said predetermined number of said modulation-removed symbols are located at the beginning of said segment.

4. The apparatus according to claim 1, wherein said tracking processor comprises a zero-forcing equalizer.

5. The apparatus according to claim 1, wherein said tracking processor comprises a minimum mean-square error equalizer, and wherein said estimator is adapted to estimate a signal-to-noise ratio based on said preamble portion, said signal-to-noise ratio being supplied to said minimum mean-square error equalizer.

6. The apparatus according to claim 5, wherein said tracking processor is adapted to perform signal-to-noise ratio estimation based on a predetermined number of symbols of each segment, and to store the estimation result so as to be used for symbols received after a current segment.

7. A method comprising:
performing frequency-offset and channel estimation based on a preamble portion of a received data packet;
partitioning a payload portion of said received data packet into segments; and
applying frequency-offset tracking and channel-gain tracking based on said segments of said payload portion, including:
applying an initial frequency offset compensation and channel equalization to symbols in a current segment by using estimates of a residual frequency offset and a residual channel gain established on the basis of symbols in a previous segment, resulting in channel-equalized symbols;
demodulating the channel equalized symbols, resulting in demodulated symbols;
removing modulation in the channel-equalized symbols by using the demodulated symbols, resulting in modulation-removed symbols;
estimating a residual frequency offset for the current segment based on a predetermined number of the modulation-removed symbols;
frequency-offset compensating the modulation-removed symbols on the basis of the residual frequency offset that has been estimated for the current segment, resulting in frequency-offset-compensated modulation-removed symbols;
estimating a residual channel gain for the current segment on the basis of the frequency-offset-compensated modulation-removed symbols; and
storing the residual frequency offset and the residual channel gain, which have been estimated for the current segment, to apply an initial frequency offset compensation and channel equalization to symbols in a subsequent segment by using the residual frequency offset and the residual channel gain, which have been estimated for the current segment.

8. A computer program product embodied in a non-transitory computer readable medium comprising code adapted to produce the steps of claim 7 when run on a computing device.

9. A receiver device of a body area network, said receiver device comprising: an apparatus that includes an estimator for performing frequency-offset and channel estimation based on a preamble portion of a received data packet;

a partitioner for partitioning a payload portion of said received data packet into segments; and a tracking processor for applying frequency-offset tracking and channel-gain tracking based on said segments of said payload portion, the tracking processor being configured to:

apply an initial frequency offset compensation and channel equalization to symbols in a current segment by using estimates of a residual frequency offset and a residual channel gain established on the basis of symbols in a previous segment, so as to obtain channel-equalized symbols;

demodulate the channel equalized symbols, so as to obtain demodulated symbols;

remove modulation in the channel-equalized symbols by using the demodulated symbols, so as to obtain modulation-removed symbols;

estimate a residual frequency offset for the current segment based on a predetermined number of the modulation-removed symbols;

frequency-offset compensate the modulation-removed symbols on the basis of the residual frequency offset that has been estimated for the current segment, so as to obtain frequency-offset-compensated modulation-removed symbols;

estimate a residual channel gain for the current segment on the basis of the frequency-offset-compensated modulation-removed symbols; and store the residual frequency offset and the residual channel gain, which have been estimated for the current segment, to apply an initial frequency offset compensation and channel equalization to symbols in a subsequent segment by using the residual frequency offset and the residual channel gain, which have been estimated for the current segment.

* * * * *